United States Patent [19]

Watanabe et al.

[11] Patent Number: 5,640,377
[45] Date of Patent: Jun. 17, 1997

[54] ROTATION INFORMATION DETECTING APPARATUS AND METHOD

[75] Inventors: Hiroshi Watanabe; Masaru Nyui, both of Utsunomiya, Japan

[73] Assignee: Canon Kabushiki Kaisha, Tokyo, Japan

[21] Appl. No.: 508,901

[22] Filed: Jul. 28, 1995

[30] Foreign Application Priority Data

Aug. 1, 1994 [JP] Japan .................................. 6-199067

[51] Int. Cl.$^6$ .............................. G11B 5/09; G01D 5/34
[52] U.S. Cl. ........................................ 369/50; 250/231.16
[58] Field of Search .............................. 369/50, 32, 48, 369/54, 44.26, 44.32; 250/231.13–231.18

[56] References Cited

U.S. PATENT DOCUMENTS

| | | | |
|---|---|---|---|
| 4,803,354 | 2/1989 | Onodera et al. | 250/231.16 |
| 4,908,510 | 3/1990 | Huggins et al. | 250/231.16 |
| 5,091,643 | 2/1992 | Okutani et al. | 250/231.16 |
| 5,239,177 | 8/1993 | Cunniff | 250/231.18 |
| 5,369,271 | 11/1994 | Nyui | 250/231.16 |
| 5,406,077 | 4/1995 | Aoki et al. | 250/231.18 |
| 5,448,060 | 9/1995 | Orton | 250/231.16 |
| 5,451,776 | 9/1995 | Kolloff et al. | 250/231.18 |

FOREIGN PATENT DOCUMENTS 4-70509   3/1992   Japan .

*Primary Examiner*—Nabil Hindi
*Attorney, Agent, or Firm*—Fitzpatrick, Cella, Harper & Scinto

[57] ABSTRACT

The present invention relates to a rotation information detecting method of detecting rotation information of a rotating object, comprising the step of mounting a rotating scale on a rotating shaft of the rotating object, said rotating scale having a first pattern for detecting rotation information formed thereon in advance, the detection step of detecting the rotation information of the rotating object by detecting the first pattern and the formation step of forming a second pattern for detecting rotation information on the rotating scale on the basis of the detected rotation information.

4 Claims, 3 Drawing Sheets

ROTATION INFORMATION DETECTING APPARATUS AND METHOD

BACKGROUND OF THE INVENTION

1. Field of the Invention

The present invention relates to a rotation information detecting apparatus and method which measure the rotation information of a rotating object and are preferably applied to, e.g., a rotary encoder for measuring the angular displacement (rotational displacement) of a rotating object.

2. Related Background Art

In a conventional rotary encoder for detecting the rotation information of a rotating object, a disk-like or cylindrical scale is used, and light or magnetism is magnetically, optically, or capacitively detected through the scale and a rotational angle information pattern arranged to oppose the scale, thereby detecting the rotation information on the basis of the detection signals. In this rotary encoder (first rotary encoder), a member (scale) obtained by forming a pattern associated with rotation information on a disk substrate in advance is mounted on a rotating object, and the rotation information of the rotating object is measured by using the scale.

In a magnetic encoder using a magnetic scale and a magnetic detecting means, a magnetic medium of the write once and read many or rewritable type is used as a scale.

An optical rotary encoder (second rotary encoder) is proposed in Japanese Laid-Open Patent Application No. 4-70509. According to this official gazette, an optical disk of the write once and read many or rewritable type is used as a scale. This scale is mounted on a rotating object with no position information (format pattern) for detecting an angular displacement amount being recorded on the scale. A pattern associated with rotation information is written on the optical disk.

In order to obtain a high-precision rotary encoder, the following two conditions must be met.

(1) A high-precision pattern (radial pattern) must be formed on a scale. That is, no pitch error in the circumferential direction is allowed, and the pattern formed on a circumference must not have any eccentricity with respect to the rotation center.

(2) A pattern on the scale and its detecting means must be positioned in correspondence with the rotation of a target with a high precision.

In general, in the first rotary encoder, a high-precision scale is required, and high-precision parts are required to manufacture the scale. For this reason, as the constituent elements of the scale, high-cost parts are used. In addition, in mounting the scale and detecting means, high-precision alignment is required.

In the second conventional rotary encoder, a scale having no pattern is mounted, and the scale is rotated to form a pattern. In this method, there is no chance of misalignment between the geometrical center of the pattern and the rotation center of the target. However, in order to meet condition (1), a proper apparatus and means must be selected and used to form a pattern.

SUMMARY OF THE INVENTION

It is an object of the present invention to provide a rotation information detecting apparatus and method in which a recording layer of the write once and read many or rewritable type is formed on a surface of a scale, the scale is mounted on the central shaft of a rotating object, and second rotational position information is written on the recording layer by using first rotational position information formed in advance while the rotating object is rotated about the central shaft so that rotation information can be detected at a low cost with high precision and high resolution by using the second rotational position information.

In order to achieve the above object, according to an aspect of the present invention, there is provided a rotation information detecting method of detecting rotation information of a rotating object, comprising:

the step of mounting a rotating scale on a rotating shaft of the rotating object, the rotating scale having a first pattern for detecting rotation information formed thereon in advance;

the detection step of detecting the rotation information of the rotating object by detecting the first pattern; and the formation step of forming a second pattern for detecting rotation information on the rotating scale on the basis of the detected rotation information.

The detection step preferably includes the step of detecting rotation information by using portions of the first pattern which are positioned to oppose each other through the rotating shaft of the rotating object.

The detection step preferably includes the step of equalizing rotation information from portions of the first pattern which are positioned to oppose each other through the rotating shaft of the rotating object.

The formation step preferably includes the step of recording the second pattern on a recording layer of a write once and read many or rewritable type on the rotating scale.

The recording layer preferably has a magnetic recording medium.

The recording layer preferably has an optical recording medium.

According an aspect of the present invention, there is provided a rotation information detecting apparatus for detecting rotation information of a rotating object, comprising:

first rotation information detecting means for detecting the rotation information of the rotating object by detecting a first pattern formed, in advance, on a rotating scale mounted on a rotating shaft of the rotating object;

formation means for forming a second pattern for detecting rotation information on the rotating scale on the basis of the rotation information detected by the first rotation information detecting means; and second rotation information detecting means for detecting the rotation information of the rotating object by detecting the second pattern.

The first rotation information detecting means preferably includes means for detecting rotation information by using portions of the first pattern which are positioned to oppose each other through the rotating shaft of the rotating object.

The first rotation information detecting means preferably includes means for equalizing rotation information from portions of the first pattern which are positioned to oppose each other through the rotating shaft of the rotating object.

The formation means preferably includes means for recording the second pattern on a recording layer of a write once and read many or rewritable type on the rotating scale.

The recording layer preferably has a magnetic recording medium.

The recording layer preferably has an optical recording medium.

According to an aspect of the present invention, there is provided a rotating scale for detecting rotation information of a rotating object, comprising:

a first pattern formed on the rotating scale to detect the rotation information; and a pattern formation layer on the rotating scale on which a second pattern for detecting rotation information is formed on the basis of rotation information of the rotating object which is detected by mounting the rotating scale on a rotating shaft of the rotating object and detecting the first pattern.

The formation layer preferably has a recording layer of a write once and read many or rewritable type on the rotating scale.

The recording layer preferably has a magnetic recording medium.

The recording layer preferably has an optical recording medium.

DETAILED DESCRIPTION OF THE PREFERRED EMBODIMENTS

Figure 1:
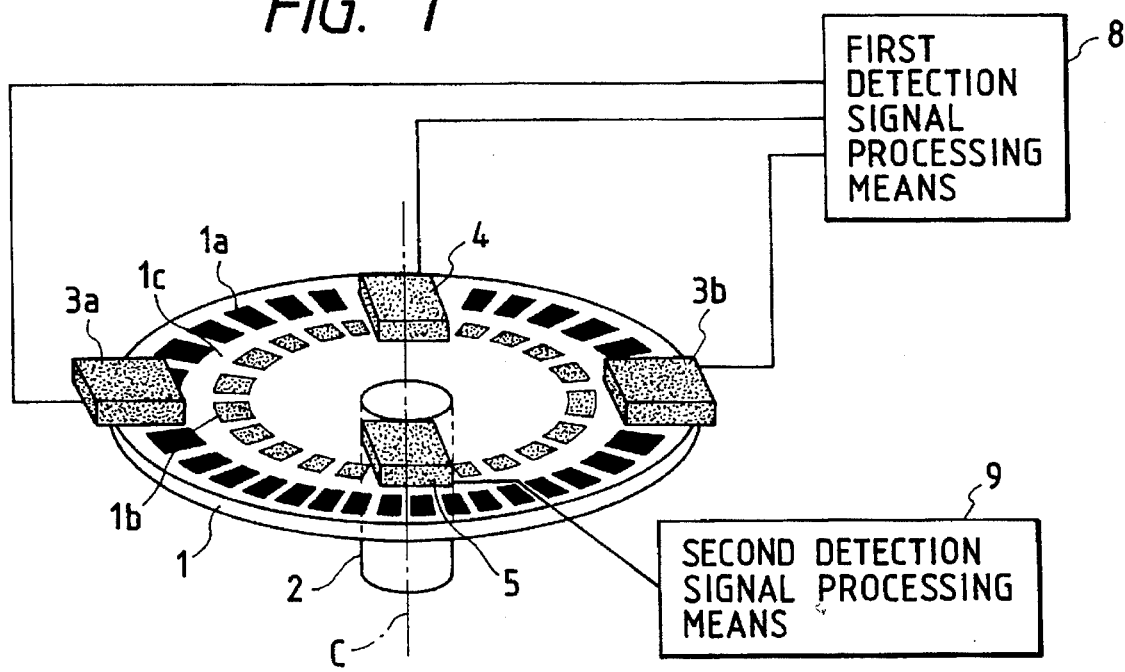
FIG. 1 is a perspective view showing the main part of the first embodiment of the present invention.

FIG. 1 is a schematic view showing the main part of the first embodiment in which the present invention is applied to a rotary encoder. Referring to FIG. 1, a scale 1 is a disk-like member having an upper surface on which a recording layer 1c of the write once and read many or rewritable type is formed. A first pattern 1a (first rotational position information) is a radial pattern recorded on the upper surface of the recording layer 1c along one circumference in advance to have an almost equal pitch. A second pattern 1b (second rotational position information) is formed on the recording layer 1c along one circumference by using the position information of the first pattern 1a, as will be described later. A rotating object to be measured has a rotating shaft 2 having a rotation center C. First detecting means 3a and 3b are arranged above the first pattern 1a on the scale 1 to oppose each other at 180° intervals through the rotation center C. The first detecting means 3a and 3b read the position information of the first pattern 1a in accordance with the rotation of the scale 1, thereby obtaining the rotation information of the target object. In this embodiment, two first detecting means are used. A recording means 4 records the second pattern 1b on the recording layer 1c by using the position information from the first detecting means 3a and 3b. A second detecting means 5 reads the position information of the second pattern 1b to obtain the rotation information of the rotating object. Note that the recording means 4 and the second detecting means 5 are set at an almost equal distance from the rotation center C. The embodiment further includes a first detection signal processing means 8 and a second detection signal processing means 9.

Figure 3:
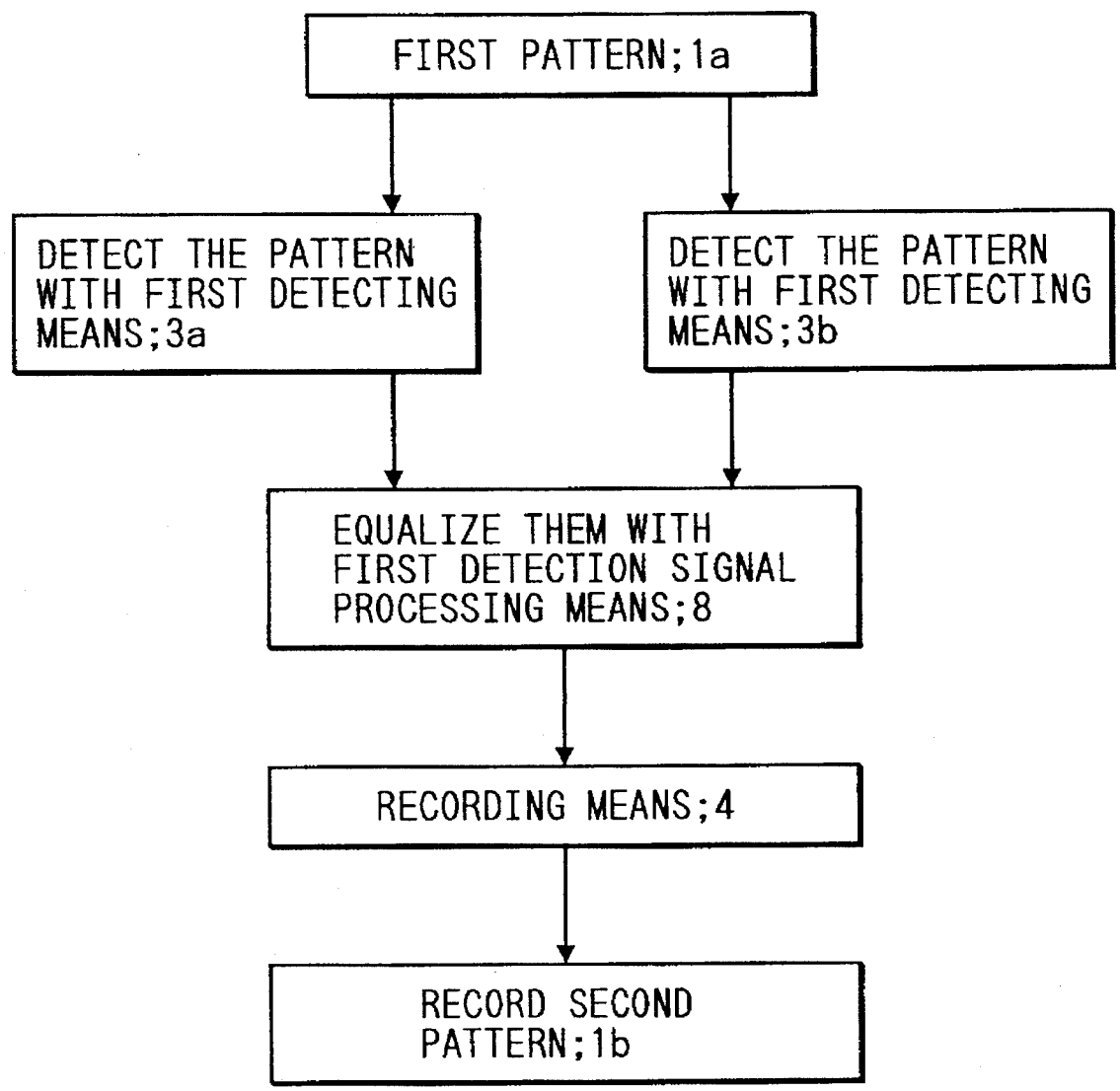
FIG. 3 is a flow chart showing the process of recording a second pattern by using a first pattern in the first embodiment of the present invention.

FIG. 3 is a flow chart showing the steps in recording the second pattern 1b by using the first pattern 1a in the process of detecting the rotation information of the rotating object in the first embodiment. A rotation information detecting method of the present invention will be described below.

First of all, the scale 1 on which the first pattern 1a is formed in advance is mounted on the rotating shaft 2 of the target object. In this case, the center of the circumference on which the scale 1 is formed need not be strictly aligned with the rotation center C.

The first detecting means 3a and 3b are then set to oppose each other at 180° intervals with respect to the rotation center C. The rotating shaft 2 is rotated in this state. The first detecting means 3a and 3b detect the position information of the first pattern 1a and output the detection signals. The first detection signal processing means 8 performs detection value equalization processing and other processing by using the output signals from the first detecting means 3a and 3b. This technique is the same as that established in a conventional rotary encoder having a plurality of detection means. If, for example, an eccentricity is present between the first pattern 1a and the rotation center C, a sine-wave-like error of one period is produced per rotation of the scale 1. This error based on the eccentricity, however, is removed by equalizing output signals from the detecting means mounted on the encoder to oppose each other at 180° intervals. This method is generally used in a rotary encoder of a high-precision type.

The second pattern 1b is formed on the scale 1 on the basis of the output from the first detection signal processing means 8 by the following method. The recording means 4 records the second pattern 1b on a circumference on the recording layer 1c on the scale 1 in synchronism with the equalized output from the first detection signal processing means 8. In this case, since the recording means 4 is fixed at a position in the radial direction of the scale 1, the second pattern 1b is formed on a circumference having the rotation center C of the rotating shaft 2 as the center. The second pattern 1b is formed according to this process in the present invention. This second pattern 1b has no eccentricity with respect to the rotation center C. For this reason, the rotation information of the rotating object can be obtained with a high detection precision.

The first detecting means 3a and 3b, the first detection signal processing means 8, and the recording means 4 may be removed after the second pattern 1b is recorded.

The rotary encoder of this embodiment detects the second pattern 1b with the second detecting means 5 and the second detection signal processing means 9 to obtain the rotation information of the rotating shaft 2.

In this embodiment, the first detecting means 3a and 3b, the recording means 4, and the first detection signal processing means 8 are used in one step in the rotation information detecting method.

In this embodiment, as the first detecting means, the two first detecting means 3a and 3b are used. If the number of such detecting means is increased, the detection precision can be easily improved.

The second pattern 1b may be formed at an angular pitch different (smaller or larger than) from the angular pitch of the first pattern 1a upon signal processing performed by the first detection signal processing means 8. With this process, the angular resolution of the second pattern 1b may be set to be different from that of the first pattern 1a.

Several information recording media of the write once and read many and rewritable types, each having the recording layer 1c in this embodiment, will be described below.

In the first example, an organic dye thin film is used as an information recording medium of the write once and read many type. An aluminum reflecting layer is deposited on a PC (polycarbonate) disk substrate (scale), and a tellurium thin film as an organic dye thin film is stacked, as the recording layer 1c, on the reflecting layer, thereby forming a disk substrate. When a laser spot beam is irradiated on the recording layer 1c of this disk substrate, each irradiated portion is heated and melted to cause a chemical change so as to form a hole in the recording layer 1c, thereby recording a pattern associated with rotation information. In a detecting operation, when a laser spot beam is irradiated on the pattern associated with the rotation information, the laser beam reaches the aluminum reflecting layer as the underlying layer at each position where a hole is present. As a result, the amount of reflected light increases. In this manner, the difference in the amount of reflected light based on the presence/absence of a hole in the recording layer 1c is detected to detect the pattern associated with the rotation information.

In the second example, a magnetic recording medium is used, which is widely used as an information recording medium of the rewritable type.

In the third example, a medium of the magneto-optical rewritable type (optical recording type) is used as an information recording medium of the rewritable type. More specifically, an FeTb-based amorphous alloy magnetic film is stacked as the recording layer 1c on a PMMA (polymethyl methacrylate) disk substrate. The FeTb-based amorphous alloy magnetic film has a composition region in which the direction of magnetization is perpendicular to the film surface, so that a high recording density can be ensured by performing a perpendicular magnetic recording operation. An erasing/recording operation with respect to this magnetic film is performed as follows. First of all, a high-energy laser spot beam is irradiated on the recording layer 1c to heat the layer 1c to its Curie temperature so that the coercive force of each irradiated portion is reduced and the magnetization in that portion is lost. After the laser spot passes the irradiated portion and the temperature of the portion drops, an external magnetic field is applied to the medium to fix the direction of magnetization of the magnetic domain. In this manner, a pattern associated with displacement information is recorded. The pattern associated with the displacement information is detected as follows. A laser spot beam having an energy lower than that used in the recording operation is irradiated on the recording layer 1c, and the rotation of the plane of polarization of the reflected light corresponding to the direction of magnetization is detected by the magnetic Kerr effect, thereby detecting the pattern associated with the rotation information.

In the fourth example, a medium of the phase change rewritable type (phase change type optical recording) is used as an information recording medium of the rewritable type. A recording method based on phase change uses the fact that a recording film exhibits different optical characteristics depending on whether it is in the crystal or amorphous state. More specifically, a chalcogenide thin film is deposited on the surface of a disk substrate consisting of an acrylic material or the like to form a polycrystalline film in an initial film state, which is used as the recording layer 1c. A pattern is recorded on this recording layer 1c as follows. A high-energy laser spot beam with a short pulse width is irradiated on the recording layer 1c. Each irradiated portion is heated and melted. After the laser spot beam passes the irradiated portion, the portion is quickly cooled by the atmosphere. As a result, the portion changes from the crystal state to the amorphous state. In this manner, a pattern associated with rotation information is recorded. Each recorded portion is erased as follows. A low-energy laser spot beam with a long pulse width is irradiated on each amorphous portion to restore the portion from the amorphous state to the crystal state. As a result, the recorded pattern is erased. The pattern associated with the rotation information is detected as follows. When a recorded portion is irradiated with light, the amount of light reflected from an amorphous portion is different from that from a crystal portion. By detecting this difference, the pattern associated with the rotation information is detected.

In addition, a recording/reproducing operation may be performed on the basis of the transmittance difference based on a phase change between a semiconductor phase and a metal phase.

In this embodiment, the recording means 4 and the second detecting means 5 are independently arranged. These means, however, can be integrated into a recording/detecting means having both recording and detection functions, as is the general case of a magnetic information recording/reproducing apparatus such as a floppy disk drive or hard disk drive.

Furthermore, the first pattern 1a need not be recorded on the recording layer 1c of the rewritable type. For example, the first pattern 1a may be constituted by a three-dimensional pit pattern. As the first detecting means 3a and 3b, conventional pattern detecting means based on a technique used in a conventional encoder, such as the magnetic scheme, the optical scheme, or the capacitance scheme may be used.

According to this embodiment, when, for example, a medium used for an optical disk of the write once and read many type is used, a laser diode having a rated output of 5 mW may be used to detect the second pattern 1b, but a laser diode having a large output of several tens of mW is required to record the second pattern 1b.

According to the present invention, however, since the recording means 4 for recording the second pattern 1b is used for part of the manufacturing process, only the second detecting means 5 and the second detection signal processing means 9 need be incorporated in the product. Since no large-output laser for a recording operation need be incorporated, the product cost does not increase.

Note that the first detecting means 3a and 3b, the first detection signal processing means 8, and the recording means 4 may be used as parts of the constituent elements of the rotary encoder. In this case, if the recording layer 1c is constituted by a medium of the rewritable type, since the second pattern 1b associated with the rotation information can be formed or reformed anytime, an easy-to-use, high-precision rotary encoder can be obtained.

Figure 2:
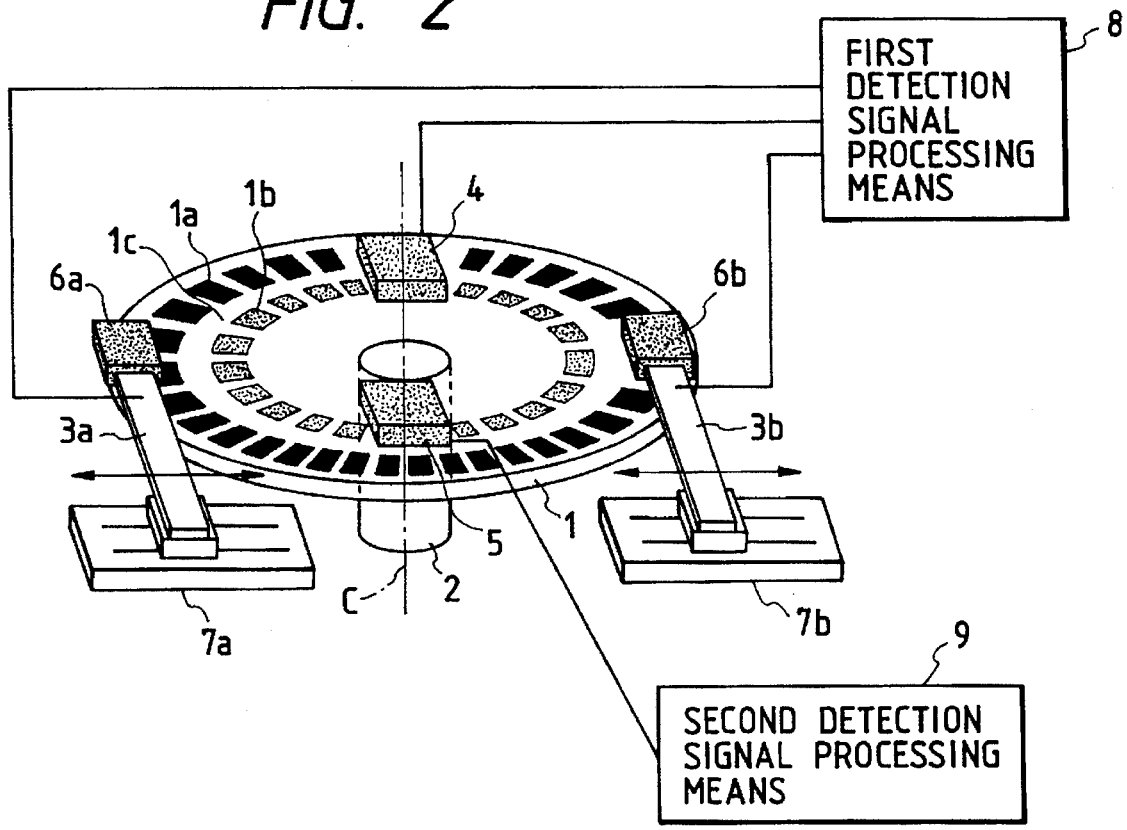
FIG. 2 is a perspective view showing the main part of the second embodiment of the present invention.
Figure 4:
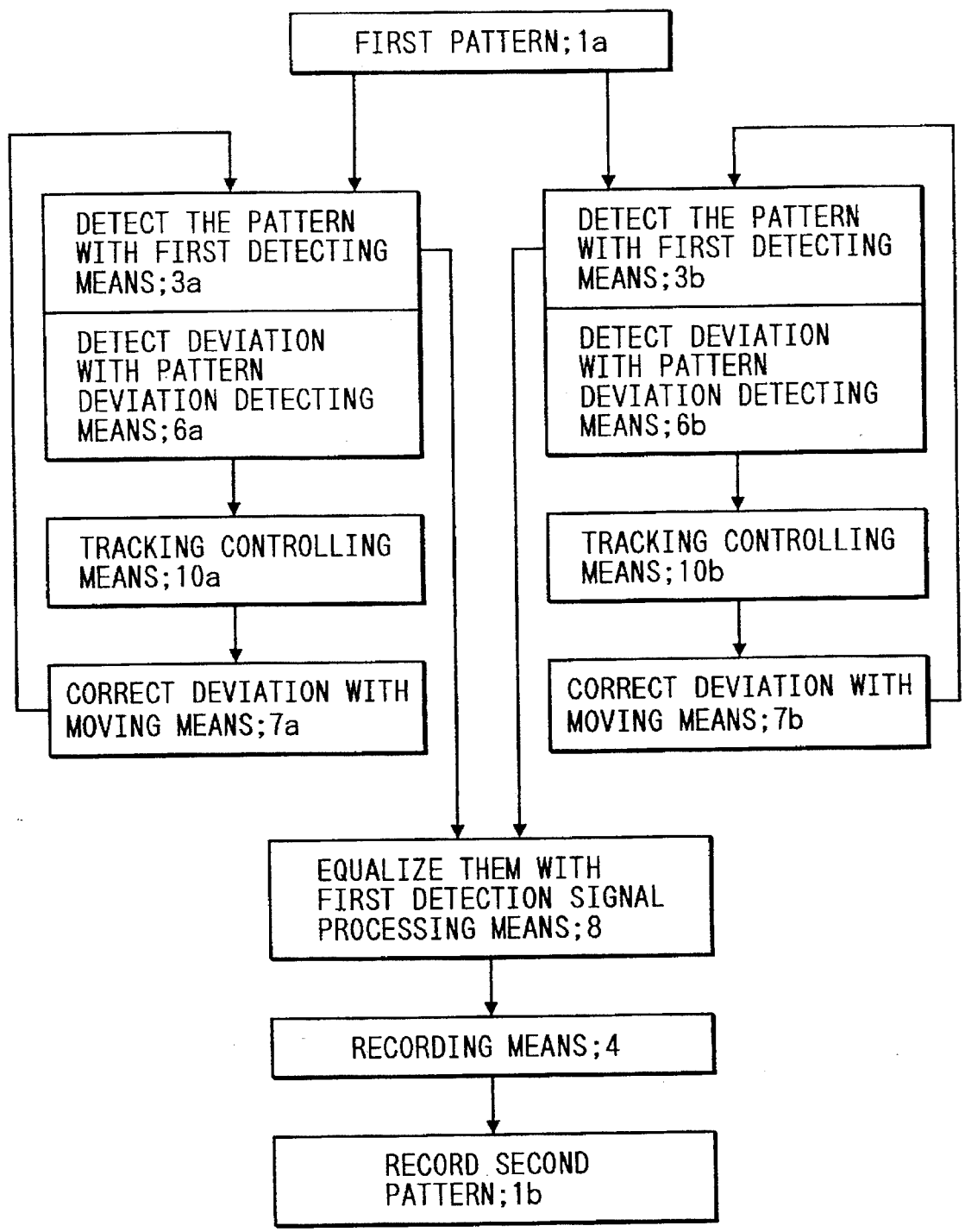
FIG. 4 is a flow chart showing the process of recording a second pattern by using a first pattern in the second embodiment of the present invention.

FIG. 2 is a schematic view showing the main part of the second embodiment of the present invention. This embodiment is the same as the first embodiment shown in FIG. 1 except that the tracking function is added to the first detecting means to increase the allowable degree with respect to the eccentricity of the first pattern 1a. FIG. 4 is a flow chart showing the steps in recording a second pattern 1b by using a first pattern 1a in the process of detecting the rotation information of the rotating object in the second embodiment.

The arrangement of the second embodiment is the same as that of the first embodiment except that pattern deviation detecting means 6a and 6b, radial moving means 7a and 7b, and tracking control means 10a and 10b are added to first detecting means 3a and 3b.

In the first embodiment, when the scale 1 is mounted on the rotating shaft 2, and the eccentricity of the first pattern 1a with respect to the rotation center C is large, the first pattern 1a falls outside the detectable ranges of the first detecting means 3a and 3b. As a result, the first pattern 1a is difficult to read. The second embodiment is designed to solve this problem.

A method generally used in an information recording or reproducing apparatus of, e.g., the magnetic, optical, or magneto-optical scheme (e.g., a CD player, a hard disk drive, or a magneto-optical disk drive) can be immediately applied to the radial moving means 7a and 7b and the tracking control means 10a and 10b of the first detecting means 3a and 3b.

This method will be further described below. The deviation amounts of the first pattern 1a with respect to the first detecting means 3a and 3b in the radial direction are detected by the pattern deviation detecting means 6a and 6b incorporated in the first detecting means 3a and 3b, and the detected amounts are output as signals. The tracking control means 10a and 10b receive the signals from the pattern deviation detecting means 6a and 6b and control the moving means 7a and 7b to give displacements corresponding to the deviation amounts to the first detecting means 3a and 3b and the pattern deviation detecting means 6a and 6b, thereby keeping the positions of the first detecting means 3a and 3b relative to the first pattern 1a constant.

In a general information recording apparatus, in order to set a large recording capacity, the detecting/recording means must be moved within the range covering the entire recording medium. In the present invention, however, since it suffices to move such a means only by a slight amount corresponding to the eccentricity of the first pattern, a simpler structure can be obtained.

In this embodiment, the first detecting means 3a and 3b, the recording means 4, the pattern deviation detecting means 6a and 6b, the moving means 7a and 7b, the first detection signal processing means 8, and the tracking control means 10a and 10b are used in one step in the rotation information detecting method. Therefore, the addition of the tracking function to the first detecting means 3a and 3b does not directly increase the cost of the product.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A rotation information detecting method of detecting rotation information of a rotating object by a rotation information detecting apparatus, the method comprising the steps of:

mounting a rotating scale on a rotating shaft of the rotating object, the rotating scale having a first pattern for detecting rotation information formed thereon in advance;

detecting the rotation information of the rotating object by first rotation information detecting means for detecting the first pattern by detecting rotation information by using portions of the first pattern which are positioned to oppose each other through the rotating shaft of the rotating object, and equalizing rotation information from portions of the first pattern which are positioned to oppose each other through the rotating shaft of the rotating object;

forming a second pattern for detecting rotation information on the rotating scale on the basis of the detected rotation information;

removing the first rotation information detecting means from the rotation information detecting apparatus; and detecting the rotation information of the rotating object by second rotation information detecting means for detecting the second pattern.

2. A method according to claim 1, wherein the formation step includes the step of recording the second pattern on a recording layer of a write once and read many or rewritable type on the rotating scale.

3. A method according to claim 2, wherein the recording layer has a magnetic recording medium.

4. A method according to claim 3, wherein the recording layer has an optical recording medium.

* * * * *